Patented Feb. 24, 1931

1,794,272

UNITED STATES PATENT OFFICE

ERIK CHRISTIAN BAYER, OF COPENHAGEN, DENMARK

MANUFACTURE OF POROUS BUILDING MATERIALS

No Drawing. Application filed February 23, 1928, Serial No. 256,496, and in Denmark February 23, 1927.

The present invention relates to improvements in the manufacture of porous building materials and its main object is to manufacture porous materials to be used for constructional purposes as for instance for walls, fireproofing heat and sound insulation and all other purposes which such materials may be used for. For materials manufactured according to the present invention the volumetric changes due to the variations of humidity in the final product are considerably reduced. Materials manufactured according to the process herein described also contain a suitable strength in a considerably shorter time than is heretofore the case for such materials.

It is known to manufacture porous building and insulating materials of mineral substances which are mixed with water or other fluids by adding to the mortar a tenacious foam and thereafter let the material dry and harden.

My invention has proven that it is possible, by a special composition of the mortar and foam to obtain a mixture which may be cured in steam under high pressure in spite of its weak consistency in the first days after its manufacture, which consistency is due to its great content of air bubbles.

The above-mentioned curing in steam under high pressure is heretofore mainly used in the manufacture of chalky sandstone, by which a compressed mixture of sand and lime is treated in this way.

It has proven that the volumetric changes in porous materials manufactured with cement due to variations of humidity are reduced to less than ⅓rd by the curing in steam under high pressure.

A mortar which is to be mixed with a tenacious foam must contain a comparatively high amount of water. Therefore, there should be added some materials which could mechanically or chemically bind this extra amount of water. As example is stated the case in which the mortar consists of lime and sand and the admixtures are cement, hydraulic substances, finely ground quartz or similar products, or mixtures of these ingredients.

It has proven that a satisfactory mortar could be made as follows:—

6.3% by weight of finely ground burnt lime (CaO), 63.5% by weight of sand, 2.5% by weight of aluminous cement, 5.0% by weight of finely ground quartz, 22.7% by weight of water.

As foam-substance, resin-soap with an addition of gelatine has proven satisfactory. It should preferably be made of the following proportions:—

2% by weight of resin-soap, 0.4% by weight of gelatine, 97.6% by weight of water.

A suitable curing time is 8 to 10 hours at a pressure of 8 to 10 atmospheres to which the materials should be exposed at an age of 12 to 36 hours.

I claim:

The process of producing a porous building material which comprises mixing a tenacious foam with mortar, forming the building material therefrom and curing the material in steam under high pressure.

In testimony whereof I affix my signature.

ERIK CHRISTIAN BAYER.